(12) United States Patent
Strack

(10) Patent No.: US 6,670,813 B2
(45) Date of Patent: *Dec. 30, 2003

(54) INTEGRATED BOREHOLE SYSTEM FOR RESERVOIR DETECTION AND MONITORING

(75) Inventor: Kurt M. Strack, Houston, TX (US)

(73) Assignee: KJT Enterprises, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/401,216

(22) Filed: Mar. 27, 2003

(65) Prior Publication Data

US 2003/0184299 A1 Oct. 2, 2003

Related U.S. Application Data

(63) Continuation of application No. 09/938,355, filed on Aug. 23, 2001, now Pat. No. 6,541,975.

(51) Int. Cl.[7] .............................. G01V 1/40; G01V 3/38; G01V 11/00
(52) U.S. Cl. ....................... 324/323; 324/338; 324/339; 324/343; 324/366; 324/371; 181/102; 367/25; 702/7
(58) Field of Search ................................. 324/323, 338, 324/339, 371, 343, 347, 366; 340/870.11, 855.4, 855.5, 853.1; 367/14, 15, 25; 181/102, 106, 108; 702/6, 7; 703/10

(56) References Cited

U.S. PATENT DOCUMENTS

| | | | | | |
|---|---|---|---|---|---|
| 2,436,503 A | * | 2/1948 | Cleveland | ............... | 346/33 WL |
| 2,974,273 A | * | 3/1961 | Vogel et al. | ................. | 324/353 |
| 4,472,684 A | * | 9/1984 | Schuster | ..................... | 324/339 |
| 4,481,472 A | * | 11/1984 | Gianzero | ................... | 324/339 |
| 4,575,831 A | * | 3/1986 | Decorps et al. | ................. | 367/33 |
| 4,724,390 A | * | 2/1988 | Rauscher et al. | ............ | 324/344 |
| 4,849,699 A | * | 7/1989 | Gill et al. | .................... | 324/339 |
| 4,945,310 A | * | 7/1990 | Jackson | ....................... | 324/349 |
| 5,115,198 A | * | 5/1992 | Gianzero et al. | ............ | 324/339 |
| 5,329,448 A | * | 7/1994 | Rosthal | .......................... | 702/7 |
| 5,345,179 A | * | 9/1994 | Habashy et al. | ............. | 324/338 |
| 5,467,018 A | * | 11/1995 | Ruter et al. | .................. | 324/336 |
| 5,508,616 A | * | 4/1996 | Sato et al. | ................... | 324/343 |
| 5,537,364 A | * | 7/1996 | Howlett | ........................ | 367/57 |
| 5,543,715 A | * | 8/1996 | Singer et al. | ................ | 324/368 |
| 5,563,513 A | * | 10/1996 | Tasci et al. | .................. | 324/359 |
| 5,689,068 A | * | 11/1997 | Locatelli et al. | .......... | 73/152.02 |
| 5,698,982 A | * | 12/1997 | Mitchell | ...................... | 324/339 |
| 5,841,280 A | * | 11/1998 | Yu et al. | ..................... | 324/323 |
| 5,862,513 A | * | 1/1999 | Mezzatesta et al. | ........... | 702/9 |
| 5,870,690 A | * | 2/1999 | Frenkel et al. | ................ | 702/7 |
| 5,883,515 A | * | 3/1999 | Strack et al. | ................ | 324/339 |
| 5,955,884 A | * | 9/1999 | Payton et al. | ............... | 324/339 |
| 6,025,722 A | * | 2/2000 | Evans et al. | ................. | 324/373 |
| 6,147,496 A | * | 11/2000 | Strack et al. | ............... | 324/343 |
| 6,541,975 B2 | * | 4/2003 | Strack | ......................... | 324/323 |

* cited by examiner

Primary Examiner—Walter E. Snow
Assistant Examiner—Reena Aurora
(74) Attorney, Agent, or Firm—E. Eugene Thigpen; Richard A. Fagin

(57) ABSTRACT

A method is disclosed for generating an image of earth formations penetrated by a wellbore. The method includes generating an initial model of the earth formations using formation resistivity measured by a direct current signal. A response to the initial model of an instrument used to make the direct current resistivity measurements is calculated. The calculated response is compared to the measurements of resistivity. The model is adjusted, and the calculating and comparing are repeated until a difference between the calculated response and measurements reaches a minimum. The adjusted model is refined based on resistivity measurements made using an electromagnetic measuring instrument, and the refined model is constrained using acoustic velocity measurements.

8 Claims, 10 Drawing Sheets

INTEGRATED BOREHOLE SYSTEM FOR RESERVOIR DETECTION AND MONITORING

CROSS-REFERENCE TO RELATED APPLICATIONS

This is a continuation of U.S. application Ser. No. 09/938,355 filed on Aug. 23, 2001 now U.S. Pat. No. 6,541,975. This patent application may be related to the following Disclosures:

1. Disclosure Document No. 461,019, Integrated Borehole System for Reservoir Detection and Monitoring, by Kurt-Martin Strack, Aug. 24, 1999
2. Disclosure Document No. 462,894, Method of Predicting Conductivity Anomalies Ahead of the it Using an Integrated Seismic/Electromagnetic System, by Kurt-Martin Strack, Sep. 27, 1999
3. Disclosure Document No. 462,893, Integrated Modeling System for 3D Seismic Data Using Reservoir Data as Constraints, by Kurt-Martin Strack, Sep. 27, 1999
4. Disclosure Document No. 481,380, Improving Pore Pressure Prediction Using Log Inversion and Modeling, by Kurt-Martin Strack, Oct. 18, 2000
5. Disclosure Document No. 495,407, Surface and Borehole Integrated Electromagnetic Apparatus to Determine Reservoir Fluid Properties, by Kurt-Martin Strack, Jun. 16, 2000

STATEMENT REGARDING FEDERALLY SPONSORED RESEARCH OR DEVELOPMENT

Not applicable.

BACKGROUND OF INVENTION

1. Field of the Invention

The present invention relates to apparatus and methods for imaging formation zones surrounding a borehole.

2. Background Art

Energy exploration and exploitation using boreholes drilled into earth formations require the monitoring and evaluation of physical parameters, such as resistivity and conductivity of Earth formations surrounding a borehole.

Methods of electromagnetic field excitation may be generally classified as frequency domain excitation and time domain excitation. In frequency domain excitation a continuous wave signal is transmitted, normally at a fixed frequency, although the transmission could be a plurality of superimposed frequencies. For time domain excitation, the signal, which may be a square wave, or a pulsed, triangular or a pseudo random binary sequence signal, is abruptly switched.

A limitation of frequency domain (continuous wave) excitation is the strong coupling between the transmitter and the receiver. This coupling, known as the direct mode, arises because of the detection by the receiver of the magnetic field transmitted directly from the transmitter to the receiver. The direct mode signal may be stronger than the signal received from the formation, and make it difficult to accurately measure the signal received from the formation. Methods of enhancing the resolution of the frequency domain method include the use of multi-coiled devices, such as conventional borehole induction tools, focused permanently on certain spatial areas of the formation. Such methods also include the use of tools such as an array-type induction or laterolog measurement tool to generate an array of measurements, and the application of multi-target processing techniques to the array of measurements to provide numerical focusing on selected regions of the formation. However, the net signal resulting from these multi-target processing techniques is small compared to total measured signal.

When utilizing time domain excitation, the excitation current is abruptly switched off, thereby producing a transient signal which is detected by the receiver. And because the transmitter signal is no longer being generated during the time when the transient signal is being detected, the received signal may be filtered to remove any remaining influence of the direct mode signal. The direct mode signal, which contains no information about the formation resistivity/conductivity, is excluded from the transient measurement.

The ability to separate in time, in the detected signal, the response of different spatial areas of the formation, is a significant attribute of the transient method. In accordance with Lenz's rule, upon switching off the transmitter current, induced currents in response to the change in the transmitter current. The geometric distribution of the induced currents is similar to the transmitter current which was switched off. After the transmitter current is switched off, the current begins diffusion to the outside formation. This diffusion is followed by attenuation and dispersion in which the spatial resolution in the later time stage becomes significantly reduced. However, transient field data in the later time stages have proved to be more sensitive to the distant formation resistivity than frequency domain or DC data.

Transient electromagnetic measurement techniques have been utilized in mining operations for making resistivity/conductivity measurements in which a large surface dipole antenna (often several hundred meters in length) is utilized with electromagnetic receivers located in a borehole to make measurements in zones in the Earth surrounding the borehole and between the borehole and the Earth's surface. Such use for mining operations is fairly common. More recently, geophysical operations have utilized such large surface dipole antennas on the Earth's surface, as shown in U.S. Pat. No. 5,467,018, which issued to Ruter et al. on Nov. 14, 1995. U.S. Pat. No. 5,467,018 is incorporated herein by reference for all purposes.

Until recently, modeling of the transient response had been restricted to a fairly simple, approximate model. However, methods are now known for developing a realistic model for borehole transient electromagnetic response. See, for example, Tabarovsky, L. A., Goldman, M. M., Rabinovich, M. B., Strack, K.-M., 1996, 2.5-D Modeling in Electromagnetic Methods of Geophysics, Journal of Applied Geophysics 35, 261–284. Parallel to such developments in the area of numerical modeling, the electronic capabilities in high power switching, amplifier design and data transmission have improved, thereby making a time domain borehole system feasible.

The limitation on the radial depth from which measurements may be made with the transient electromagnetic method is determined primarily by the signal-to-noise of the measurements, which is related to the impulse energy that can be generated. Further, the interpretation of the measurements is simplified if the structure of the formation boundaries has been obtained, or at least approximated, from other geophysical data, such as gravity, seismic, borehole log or geologic survey data. This information can be used to keep certain parts of the Earth parameters fixed while other parameters are interpreted from the data.

DC excitation may also be used, but the measured signal is a composite signal comprising a mixture of configurations from different regions of the subsurface. The resolution is accordingly reduced.

U.S. Pat. No. 5,955,884, which issued on Sep. 21, 1999 to Payton et al. discloses a system in which a logging tool includes at least one electromagnetic transmitter and at least one electric transmitter for applying electromagnetic energy to the formation at selected frequencies and waveforms. The electromagnetic transmitter is preferably a three axis transmitter comprising three orthogonal coils for generating the magnetic field, and the electric transmitter is preferably a three axis transmitter comprising three orthogonal electric dipole antennae for generating the electric field. U.S. Pat. No. 5,955,884 is incorporated herein by reference for all purposes.

Other issued patents which may relate to the subject matter of this invention include without limitation U.S. Pat. Nos. 5,543,715; 5,841,280; 5,862,513; 5,883,515; 5,870,690; 6,147,496, which patents are incorporated herein by reference for all purposes.

SUMMARY OF INVENTION

The invention is a method for generating an image of earth formations penetrated by a wellbore. The method includes generating an initial model of the earth formations using formation resistivity measured by a direct current signal. A response to the initial model of an instrument used to make the direct current resistivity measurements is calculated. The calculated response is compared to the measurements of resistivity. The model is adjusted, and the calculating and comparing are repeated until a difference between the calculated response and measurements reaches a minimum. The adjusted model is refined based on resistivity measurements made using an electromagnetic measuring instrument, and the refined model is constrained using acoustic velocity measurements.

Other aspects and advantages of the invention will be apparent from the following description and the appended claims.

DETAILED DESCRIPTION

Disclosed is a system for generating a map of the Earth's subsurface surrounding a borehole. In accordance with a first embodiment of the invention a borehole logging tool is utilized to make DC measurements of formation electrical resistivity, electromagnetic measurements of formation conductivity and resistivity, and seismic velocity measurements. A preliminary subsurface image, which may be referred to herein as a "pseudo-section" is generated from the DC measurements of formation resistivity. The subsurface image depicted by the pseudo-section may then be refined by utilizing the electromagnetic measurements of the formation conductivity and resistivity. Seismic velocity data may then be utilized to generate a map in which the subsurface image generated from the DC measurements of formation resistivity and the electromagnetic resistivity and conductivity measurements is constrained by the seismic data In accordance with the invention, the map is generated substantially as the logging operation is taking place.

Figure 1:
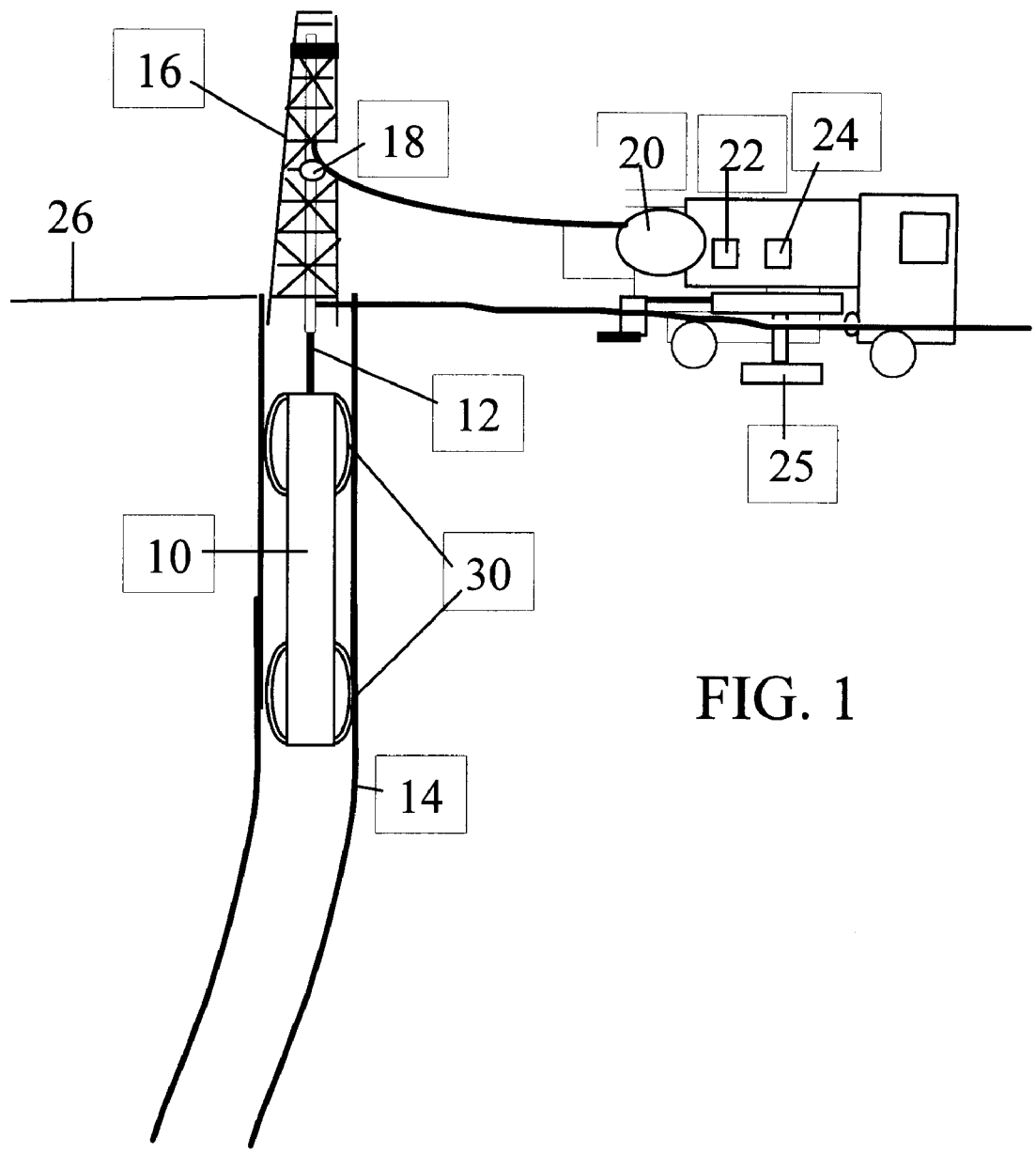
FIG. 1 is a schematic diagram depicting the operation of the invention.

In FIG. 1, a downhole measuring tool 10 according to this invention is shown disposed in a borehole 14 and supported by a wireline cable 12. The tool 10 may be centralized in the borehole 14 by means of conventional centralizers 13. The cable 12 is supported by a sheave wheel 18 disposed in a drilling rig 16 in a conventional manner and is wound on a drum 20 for lowering or raising the tool 10 in the borehole in a conventional manner. The cable 12 is a conventional multi-strand cable having electrical and/or optical conductors for carrying power and electrical and/or optical signals from the surface to the tool 10 and for transmitting data measured by the tool to the surface. At the Earth's surface 26, the cable 12 is interconnected in a conventional manner to a telemetry interface circuit 22 and a surface acquisition unit 24 which records the data. A seismic generator 25, also shown interconnected to the surface acquisition unit 24, may be included for generating seismic signals at the Earth's surface for detection by the tool 10.

Figure 2:
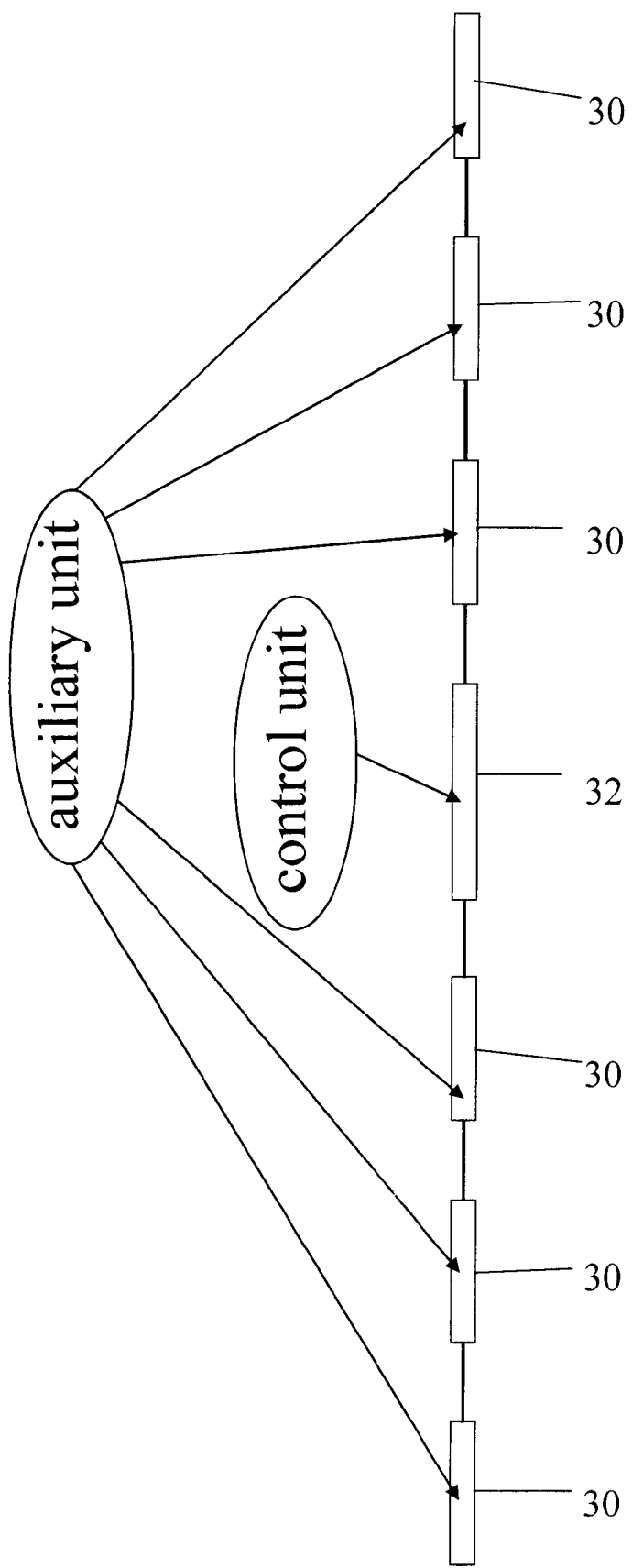
FIG. 2 is a diagram of a tool useful for practicing the invention.

FIG. 2 shows tool 10 in more detail. Typically the tool will comprise at least one central unit 32 and a number of auxiliary units 30. FIG. 2 shows only six auxiliary units. However, a typical borehole logging tool, in accordance with this invention, might include as few as one auxiliary unit or as many as 100 or more auxiliary units. In FIG. 2 the central unit 32 is shown positioned in approximately the center of a plurality of auxiliary units 30. However, the central unit may actually be positioned at either end of tool 10 or at any other location along the tool 10.

Figure 3:
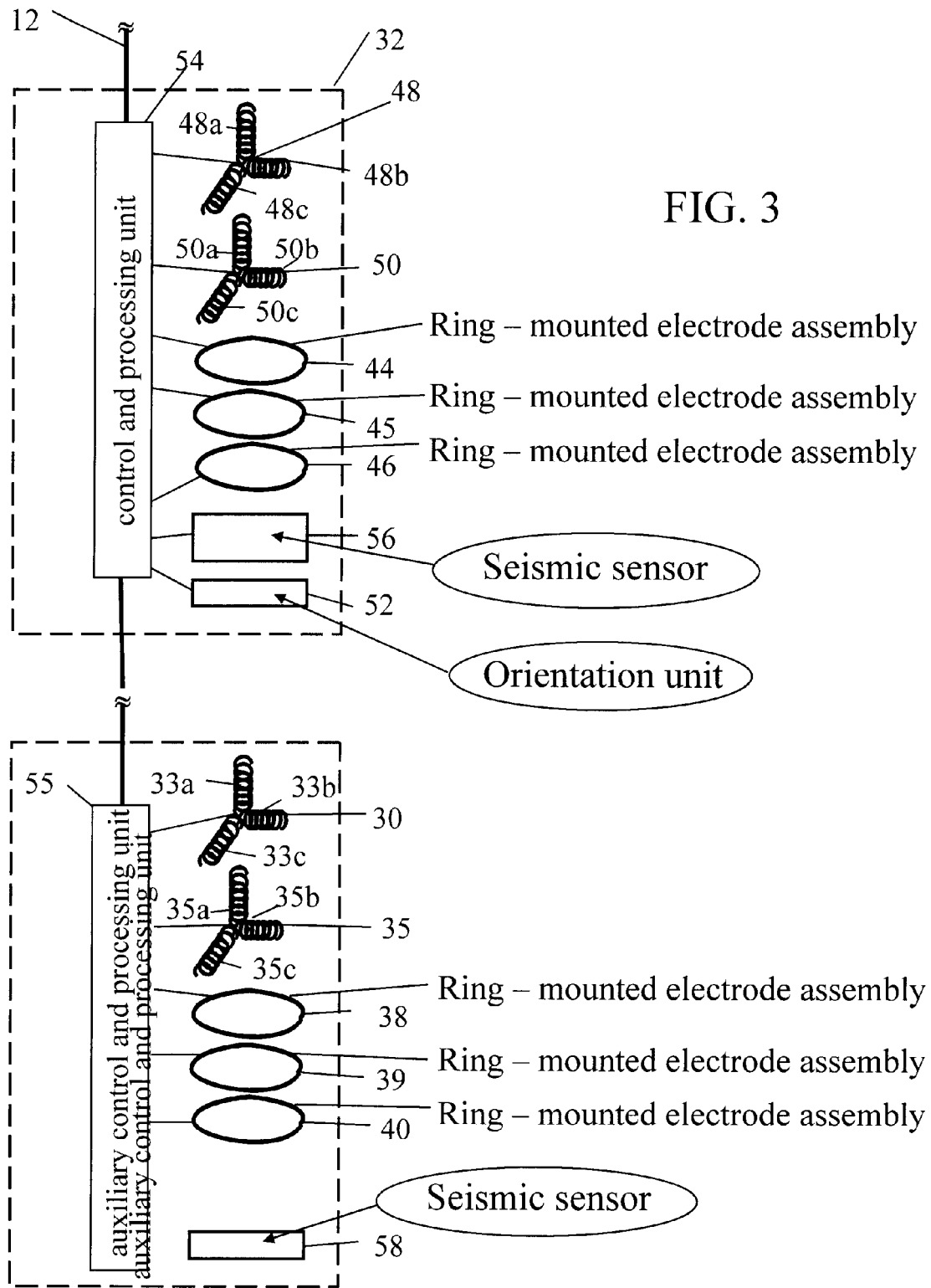
FIG. 3 is a more detailed diagram of a tool useful for practicing the invention.
Figure 4:
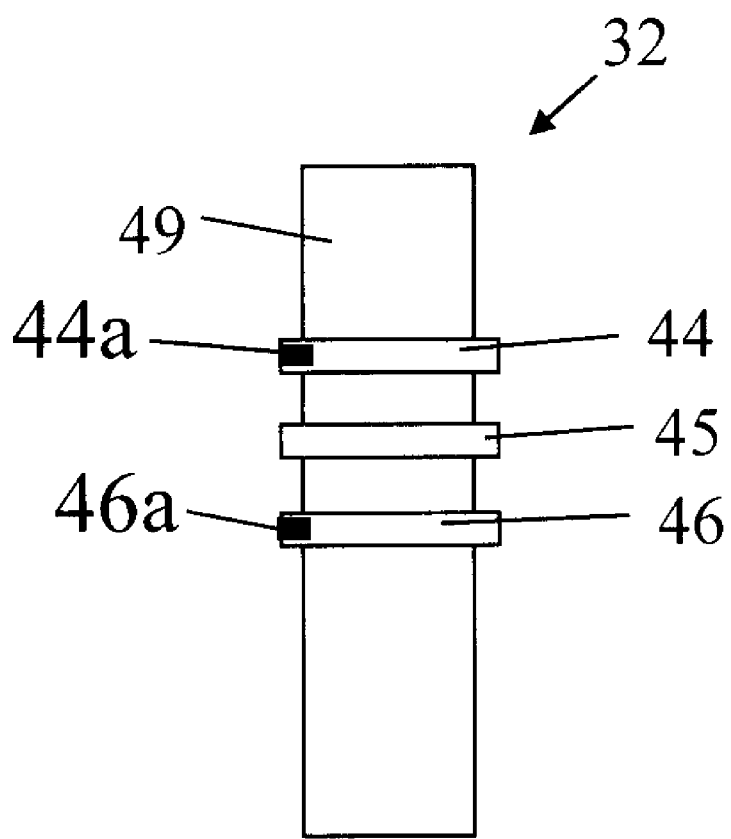
FIG. 4 is a schematic of ring-mounted electrode assemblies on a tool mandrel.

As shown in FIG. 3, central unit 32 will typically include at least two 3-component electromagnetic transmitter/receivers, shown as transmitter/receivers 48 and 50, comprising three coils 48a, 48b and 48c, and 50a, 50b and 50c, respectively, for either transmitting or detecting magnetic fields in three orthogonal orientations. The transmitter/receiver coils may be configured to either transmit or detect a magnetic field. The central unit will typically include two electromagnetic transmitter/receivers, whereas the auxiliary units will typically include only one electromagnetic transmitter/receiver, because near wellbore measurements will typically be made with the central unit. The central unit 32 will also typically include at least three ring-mounted electrode assemblies 44, 45 and 46. Although these electrode assemblies are shown in FIG. 3 within central unit 32, the ring-mounted electrode assemblies are normally mounted on the mandrel 49 of the central unit, as shown in FIG. 4.

Central unit 32 will normally also include a seismic sensor 56, which may be a 3-component geophone adapted to sense seismic signals in each of three orthogonal directions. In particular embodiments seismic sensor may be a 4-component sensor in which a pressure sensor, such as a hydrophone, is utilized along with a 3-component geophone.

Four component geophones may also be utilized in which the four sensors are at a 54 degree angle orientation with respect to each other, rather than orthogonal as in a typical 3-component geophone. A four component geophone in which the sensors are at 54 degree angles from each other has an advantage in that the noise sensitivity is equal in all four components; that is, the sensors will be equally sensitive to noise from all directions. In particular embodiments, the seismic sensor may be a 5-component sensor in which a pressure sensor is utilized along with a 4-component geophone.

The central unit 32 will also normally include orientation unit 52, which may be a standard orientation device known to those of ordinary skill in the art, such as a triaxial magnetometer and/or a gyro.

As shown in FIG. 3, each of the auxiliary units 30 will typically include at least one 3-component electromagnetic transmitter/receiver 33 comprising three coils 33a, 33b and 33c for either detecting or transmitting magnetic fields in three orthogonal orientations. The transmitter/receiver coil may be configured to function as either a transmitter or a receiver. If it is desired to transmit and receive a magnetic signal within the same auxiliary unit, a second 3-component electromagnetic transmitter/receiver 35 comprising three coils 35a, 35b and 35c may also be included.

Each of the auxiliary units will typically also include at least three ring-mounted electrode assemblies, shown as ring-mounted electrode assemblies 38, 39 and 40, in FIG. 3. Each of the auxiliary units will also normally include a seismic sensor 58, which may be a 3-component geophone adapted to sense compressional wave seismic signals in each of three orthogonal directions. In particular embodiments the seismic sensor may be a 4-component sensor in which a pressure sensor, such as a hydrophone, is utilized along with a 3-component geophone. Four component geophones may also be utilized in which the four sensors are at a 54 degree angle from each other, rather than orthogonal as is typical for a 3-component geophone. In particular embodiments, the seismic sensor may be a 5-component sensor in which a pressure sensor is utilized along with a 4-component geophone.

Figure 5:
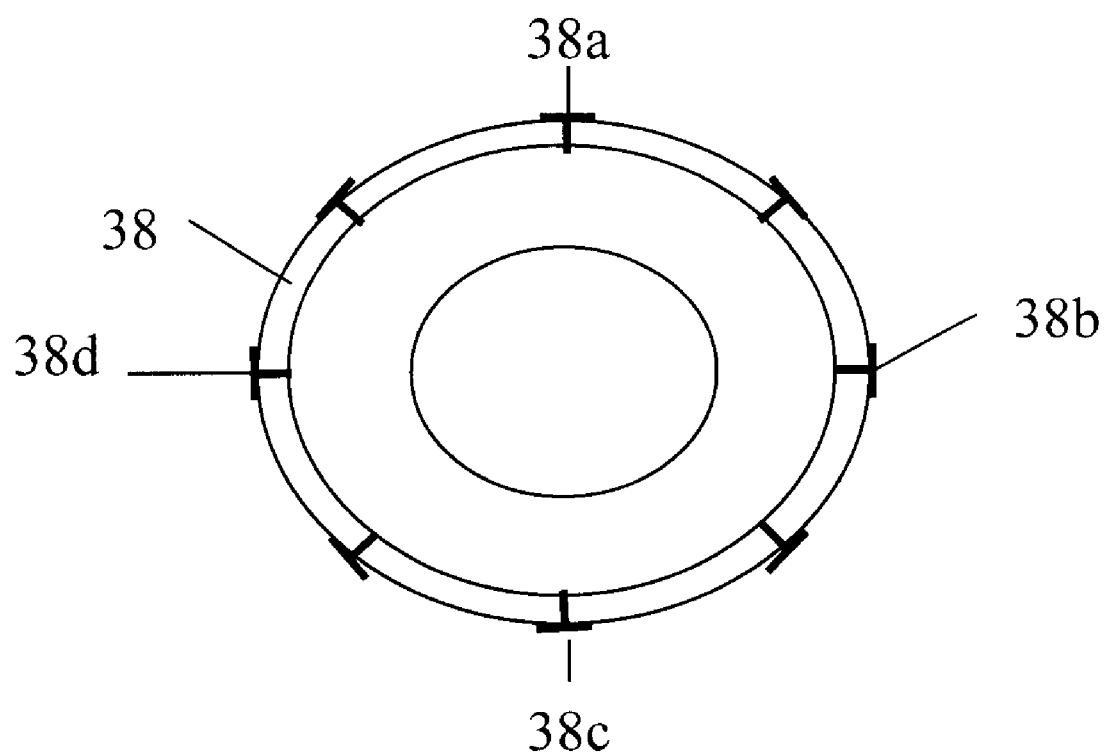
FIG. 5 is a schematic of a ring-mounted electrode assembly.

Each of the ring-mounted electrode assemblies includes a number of point contacts. Each of the point contacts may function as an electrode, or all of the contacts may be utilized together to form a ring electrode. If the ring-mounted electrode assemblies are mounted on a metal mandrel, these point contacts will be electrically isolated from the mandrel. FIG. 5 shows a top view of ring-mounted electrode assembly 38. For clarity, only four point contacts are referenced in FIG. 5, designated as point contacts (electrodes) 38a, 38b, 38c and 38d. However, a larger number of electrodes, such as 16, might typically be included on a ring-mounted electrode assembly. The electrodes may be connected to function in various configurations. For example, if an electrical voltage is to be applied or detected, or if an electric current is to be applied, between two locations extending in the z direction, in the axial direction of the borehole, the electrodes on a ring would all be activated simultaneously (or interconnected) so that the electrodes function as a ring electrode. If it is desired to apply or detect an electric voltage, or apply a current, in the x or y directions, perpendicular to the axis of the borehole, such electrical voltage or current could be applied or detected between electrodes 38a and 38c or between electrodes 38b and 38d. Control and processing unit 54 in the central unit 32, and auxiliary control and processing units 55 in the auxiliary units will control the electrode interconnections.

The central unit 32 will normally include control and processing unit 54. Control and processing unit 54 includes means for function control and for communication, including the transmission of data to the surface, and the electronics to achieve buffering to control communications. Control and processing unit 54 also includes means for performing near wellbore definition. Those of ordinary skill in the art will understand that near wellbore measurements may utilize borehole logging instrument in addition to those comprising the present invention. Near wellbore definition may include but is not limited to definition of tool eccentricity, borehole rugosity, fractures, mud invasion, fracture dip and azimuthal and other parameters related to borehole conditions, environmental corrections, invasion effects and near wellbore formation parameters. Control and processing unit 54 receives control signals from surface acquisition unit 24. Control and processing unit 54, in turn, applies the appropriate control signal to the electromagnet transmitter/receivers and to the electrodes. Control and processing unit 54 controls which of the electromagnetic transmitter/receivers and which of the electrodes serve as the transmitter at any given time and which serve as receivers. Control and processing unit 54 also controls the reception of seismic (acoustic) signals by seismic detector 56. In an optional embodiment control and processing unit 54 may also include a computer processing unit for accomplishing selected processing steps downhole in the tool.

Control and processing unit 54 also transmits control signals to and receives data signals from the auxiliary control and processing unit 55 in each of the auxiliary units. Auxiliary control and processing unit 55 in turn applies the appropriate control signals to the electromagnet transmitter/receivers and to the electrodes in the auxiliary units to either transmit or receive the appropriate signals. Control and processing unit 55 also controls reception of seismic signals by seismic detectors 58. Communication between the central unit 32 and the auxiliary units 30 is normally digital with each auxiliary unit having a unique address. Control and processing unit 54 may also perform certain signal processing, including but not limited to transmitter and system response corrections, noise filtering, data averaging and signal-to-noise improvement.

Figure 6:
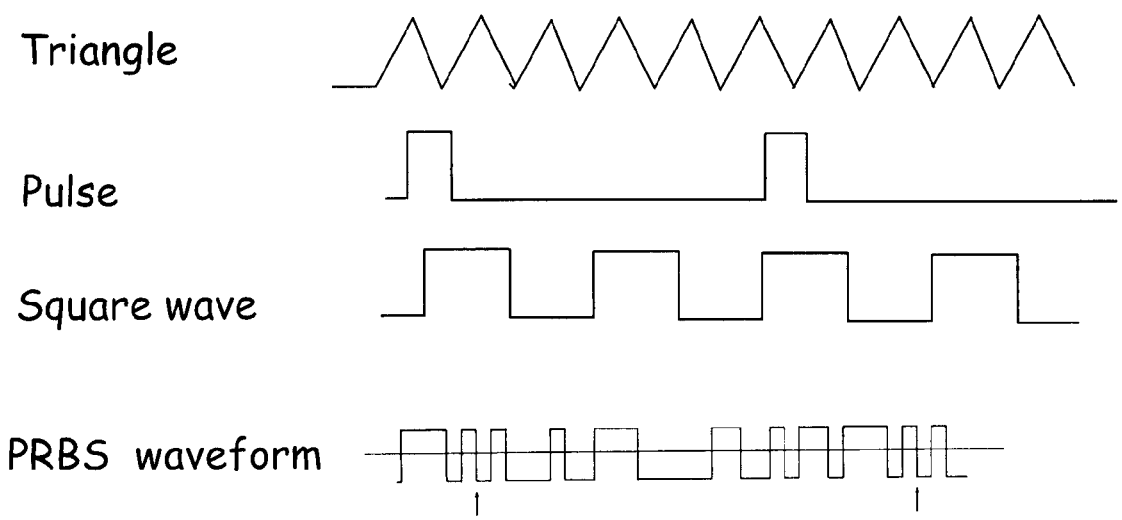
FIG. 6 illustrates time domain excitation signal waveforms.

In accordance with the present invention, the electromagnetic transmitter/receivers and electrodes may be utilized to generate and to detect signal in a plurality of different modes. As used herein, the term "time domain" refers to measurements made utilizing an excitation signal in which current is abruptly switched, thereby producing a transient signal. For time domain excitation, the excitation signal will typically be either a square wave, or a pulsed or triangular wave, or a pseudo random binary sequence (PBRS) signal, such as illustrated in FIG. 6. A "frequency domain" measurement normally utilizes a sine wave excitation signal. A ADC@ measurement is made with the excitation signal held at a constant state. In making DC measurements it is advantageous to utilize a slowly varying AC signal in order to prevent polarization of the electrodes, however, the rate of change of the AC signal would be sufficiently slow that a measurement at a given sample time measures the DC response of the formation.

The different modes in which measurements may be made by the tool 10 include but are not limited to the following:

Mode 1

A time domain measurement in which a signal is generated by an electromagnetic transmitter (3 components x, y, z) and detected by an electromagnetic receiver (3 components x,y,z). This measurement is mainly sensitive to the conductivity of the conductive strata of the formation.

Mode 2

A time domain measurement in which a signal is generated by an electric dipole (z direction only) and detected by an electromagnetic receiver (3 components x, y, z). This measurement has mixed sensitivity to conductive and resistive portions of the formation. This measurement is sensitive to the resistivity of the formation because the generated signal is a time domain (transient) signal generated by an electric dipole. The measurement is sensitive to conductivity of the formation because the signal is sensed by an electromagnetic receiver which is sensitive to a magnetic field which is proportional to current flow in the formation.

Mode 3

A time domain measurement in which a signal is generated by an electric dipole (z direction only) and detected by an electric dipole receiver (3 components x, y, z). This measurement is mainly sensitive to the resistive formation.

Mode 4

A time domain measurement in which a signal is generated by an electromagnetic transmitter (3 components x, y, z) and detected by an electric dipole (3 components x, y, z). This measurement provides information which is substantially the same information as provided by the Mode 2 measurement, but may be performed for redundancy. This measurement is sensitive to the conductivity of the formation because the generated signal is a time domain (transient) signal generated by the electromagnetic transmitter. The measurement is sensitive to resistivity of the formation because the signal is sensed by a dipole receiver which is sensitive to the voltage resulting from current flow.

Mode 5

A DC measurement in which a signal is generated by a dipole transmitter (z direction only) and detected by an electromagnetic receiver (3 components x, y, z). Typically this measurement will not add additional information to the information obtained with the Mode 6 measurement. This measurement may be made to confirm consistency of the measurement. This measurement theoretically should provide only a constant signal, because a DC voltage will not produce a magnetic field. Any major change from a constant signal can be interpreted as either a signal resulting from the equipment functioning, the tool malfunctioning, a signal resulting from a highly conductive structure in the formation (such as pyrites), or a signal resulting from the wellbore itself, such as a very large self-potential, or a very large induced polarization associated with dissemination processes in a hydrocarbon reservoir.

Mode 6

A DC measurement in which a signal generated by a dipole transmitter (z direction only) and detected by a dipole detector (z direction only). This measurement provides the dipole to dipole resistivity measurement from which a pseudo section is generated in accordance with the present invention.

In a preferred embodiment of the invention, DC measurements of formation resistivity are made in Mode 6 will be utilized to generate a preliminary subsurface image referred to herein as a "pseudo section". Electromagnetic measurements made in Modes 1, 2, 3 are then utilized to refine the pseudo section image. Mode 1 detects primarily conductive regions of the formation. Mode 2 detects conductive and resistive regions of the formation. Mode 3 detects primarily resistive regions of the formation. In another embodiment the measurements of Mode 4 are utilized in conjunction with the measurements of Modes 1, 2 and 3.

The measurements performed in Mode 6 will develop the initial image of the formation. In performing the measurements of Mode 6, an electric current is applied to the formation by a first dipole, in which the current enters the formation from a first electrode (comprising the electrodes of a ring-mounted electrode assembly configured to function as a ring electrode) and returns from the formation through a second ring electrode, spaced apart from the first ring electrode. Typically, the current will enter the formation from electrode ring 44 and return through electrode ring 46 of the central unit, or the current will enter the formation from electrode ring 38 and return through electrode 40 of an auxiliary unit. Voltages are then measured between two electrodes, for example electrodes 38 and 40, in each of the other auxiliary units, or electrodes 44 and 46 in the central unit. The signal is then successively transmitted by all other auxiliary units and the central unit and the signal detected by detectors in all auxiliary and central units that are not transmitting the signal, until a signal is transmitted from all central and auxiliary units, and, for each transmission, are detected by detectors in all units that are not transmitting the signal.

Azimuthal variations in resistivity may also be measured by the measurements of Mode 6. But, rather than forming a receiver dipole from two ring electrodes longitudinally spaced apart in the z direction, a dipole may be formed from a first electrode (such as electrode 44a illustrated in FIG. 4) and a second electrode longitudinally spaced from the first electrode (such as electrode 46a illustrated in FIG. 4). Such a dipole configuration will be sensitive to conductive regions of the subsurface, such as fluid filled fractures, on the side of the borehole on which the receiver dipole is positioned. Other such dipoles may be formed from other such longitudinally displaced electrode pairs at other lateral positions around the borehole, and each such dipole pair will be sensitive to formation conductive regions, such as fluid filled fractures, on the side of the borehole on which the electrode pair is positioned.

Figure 7:
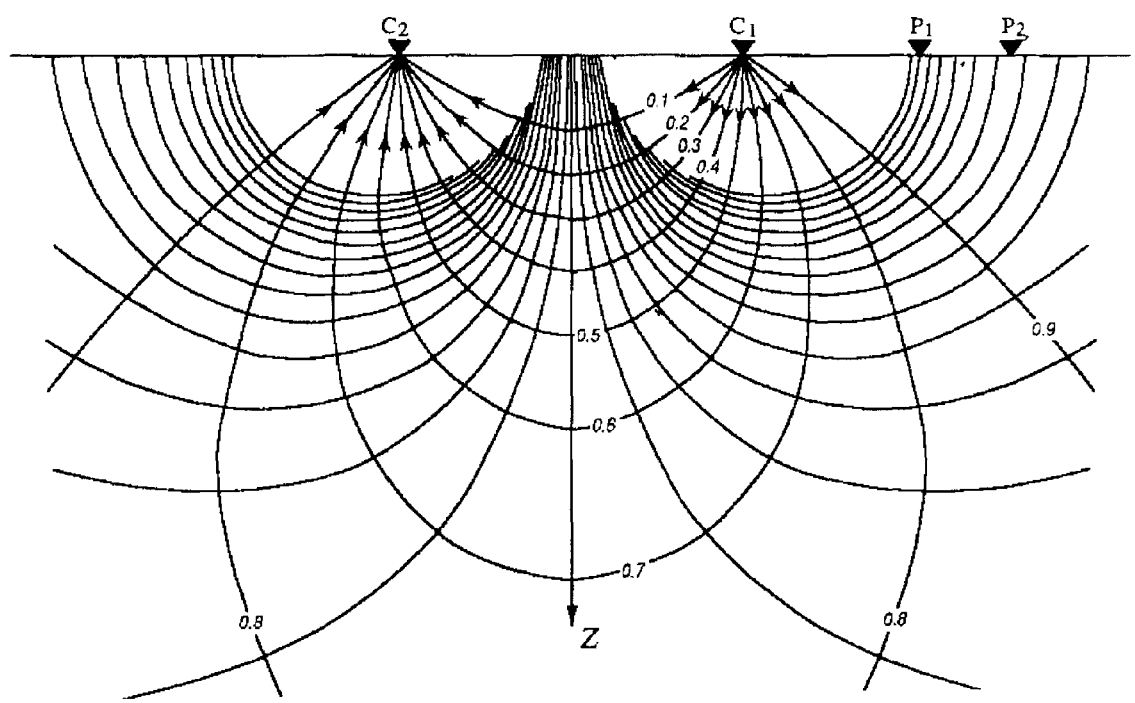
FIG. 7 shows the distribution of current and potential lines for a current dipole.

FIGS. 7, 8, 9A, 9B and 9C illustrate the use of the measurements from Mode 6. In making the measurement of Mode 6, FIG. 7 shows the distribution of current and potential lines for a current dipole, referred to in FIG. 7 as electrodes $C_1$ and $C_2$, comprising two electrodes at the borehole surface. The surface is representative of a vertical slice of the Earth to one side of a borehole. The current lines, which are the curved lines extending from $C_1$ through the formation to $C_2$, represent the surfaces of tubes each of which carries one-tenth of the current from electrode $C_1$ to electrode $C_2$. FIG. 7 also shows the resulting equipotential field lines, which are perpendicular to the current lines. These potential field lines extend to the surface of the borehole, and produce a voltage differential at spaced apart locations along the borehole wall. This voltage difference may be measured by voltage electrodes, identified in FIG. 7 as electrodes $P_1$ and $P_2$. It is understood that the amount of current flow through any particular path between $C_1$ and $C_2$ is a function of the resistivity along that path, and that the portion of the formation whose resistivity will most strongly affect the voltage across electrodes at the position of electrodes $P_1$ and $P_2$ is approximately the region where a line drawn from the location of the center of electrodes $C_1$ and $C_2$ into the formation at a 45 degree angle from the borehole wall and extending toward the electrodes $P_1$ and $P_2$ will intersect another line drawn from the location of the center of electrodes $P_1$ and $P_2$ into the formation at a 45 degree angle from the borehole wall extending toward the electrodes $C_1$ and $C_2$. Accordingly, voltage sensing electrode pairs which are spaced further from the current electrodes will sense the resistivity of regions of the formation which are deeper into the formation from the borehole surface.

Figure 8:
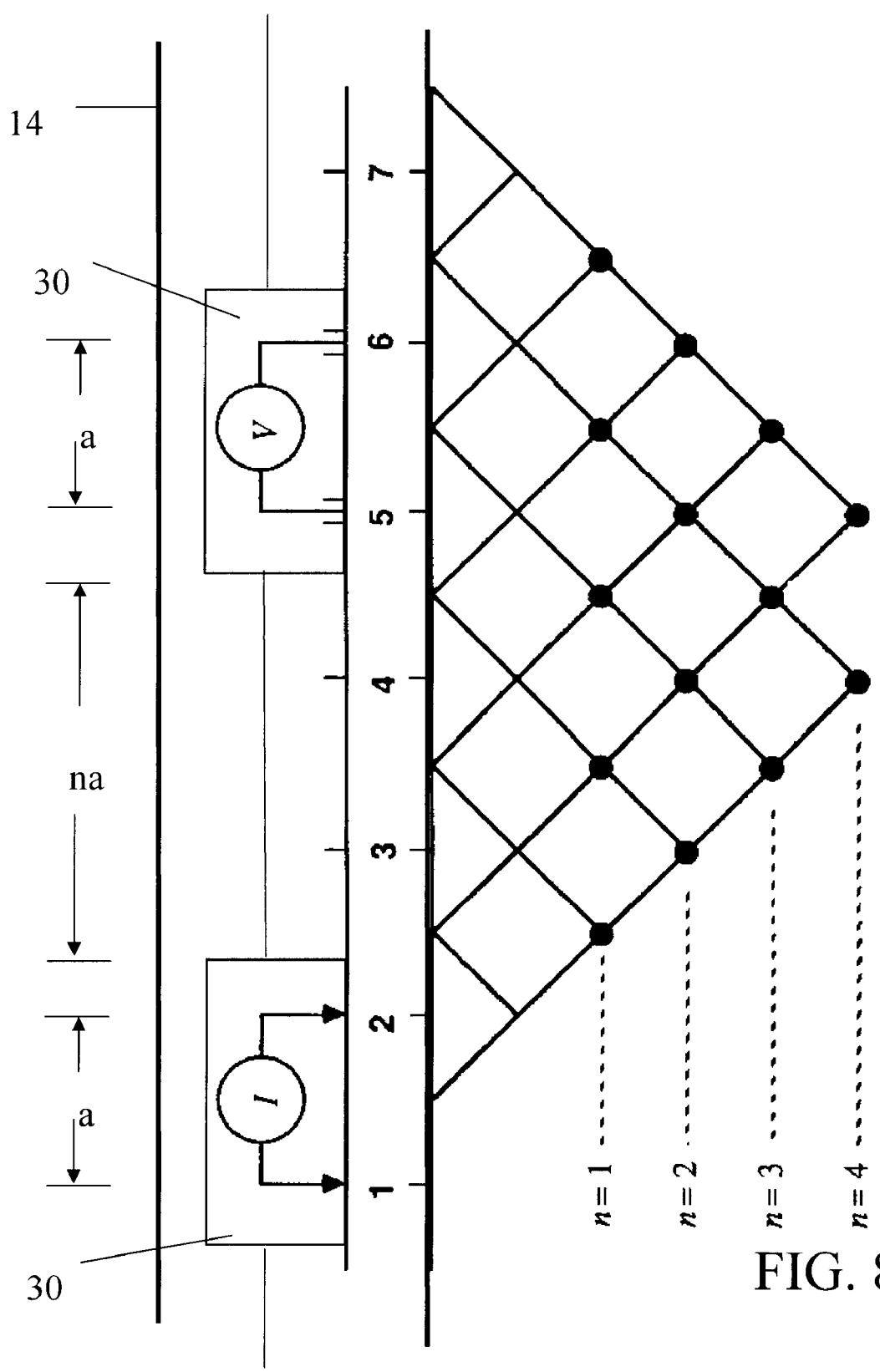
FIG. 8 illustrates the placement of electrodes along a borehole wall.

With reference to FIG. 8, and as explained above, the current electrodes through which the current is applied to the formation may comprise two ring electrodes in one of the units (central or auxiliary) of tool 10. Voltage measurements are then made between pairs of electrodes on the other units (central and auxiliary) of tool 10. In FIG. 8, the unit spacing between the electrodes of a dipole is represented as "a", and the spacing from the center of the current electrodes and the respective voltage measurement electrodes is Ana@, where An@ represents the number of unit spacings between the current electrodes and the respective voltage electrodes. The resulting resistivity value obtained from the injection current measurement on one electrode and the voltage recorded on the other electrode is displayed at the location of the intersection of the 45 degree projection line between the electrode centers. Taking large n values, as obtained from larger spacings, one obtains a greater depth of investigation.

In another embodiment of the invention a source dipole and/or a detector dipole may also comprise a first electrode in one of the central or auxiliary units and a second electrode in another of the central or auxiliary units, because the greater spacing will provide better signal to noise ratio.

Figure 9A:
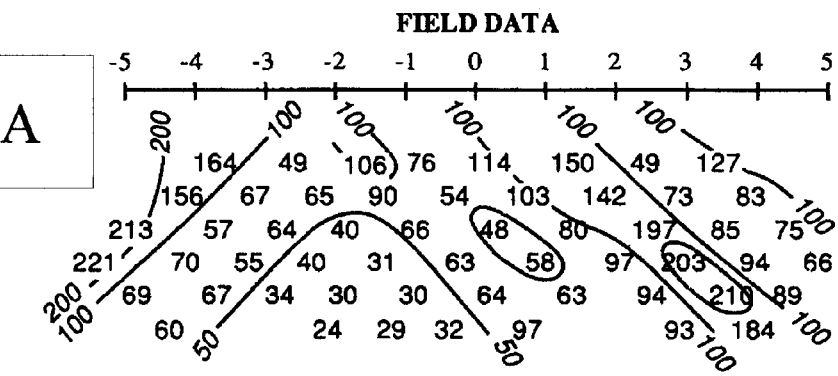
FIGS. 9A, 9B and 9C illustrates steps in developing a borehole image.

FIG. 9A shows a graphic representation of resistivity measurements made in Mode 6 along a portion of a borehole. Although FIG. 9A shows only a vertical slice of the formation on one side of the borehole, the formation surrounding the borehole is assumed to be circumferentially symmetric, so that the pseudo section extends around the circumference of the borehole. Measurements are made at successive locations along the wellbore to develop data for generating the pseudo-section. The measurements will provide an apparent resistivity from which a pseudo section may be developed For each position of the current dipole, voltage measurements will be made at a plurality of positions of a voltage dipole. For each current dipole/voltage dipole position, the measured data point is plotted at the position where the line from the current dipole intersects the line from a voltage dipole (as described above). The data values at the line crossings are then contoured, as shown by the contour lines in FIG. 9A, to obtain an approximate image of the subsurface.

Figure 9B:
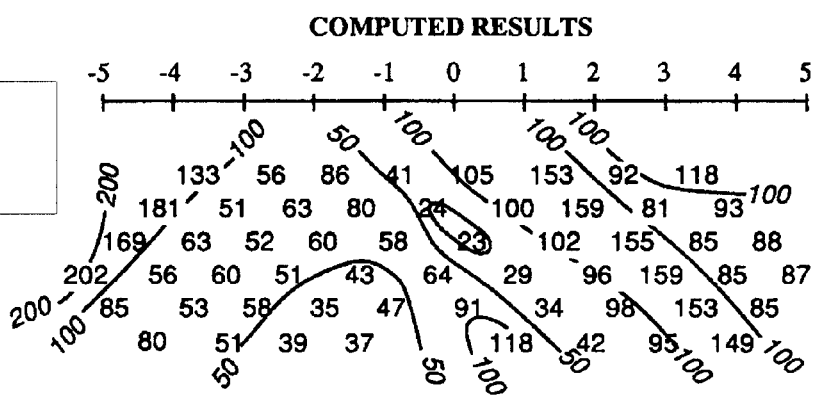
Figure 9C:
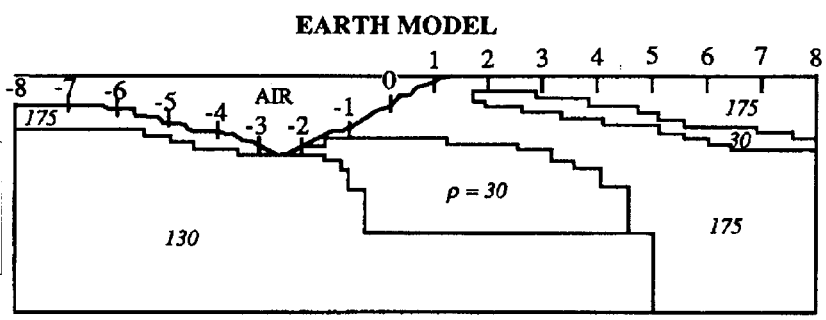

The field data from FIG. 9A are interpreted by selecting an Earth model based on the field data measurements, utilizing inversion and imaging processes known to those of ordinary skill in the art. FIG. 9C shows an example for a complicated Earth model. A calculated response to the Earth model using the same tool configuration as utilized for making the borehole measurements is then generated and this calculated response of the Earth model is compared to the measured field data. The Earth model is varied until a good match is achieved between the calculated response of the Earth model and the field data. FIG. 9B shows such a computed response to the Earth model of FIG. 9C for which a two-dimensional numerical algorithm was utilized to compute the response.

The electromagnetic measurements from Mode 1, 2 and 3 are then utilized to obtain estimates of conductivity and resistivity of the Earth's subsurface surrounding the borehole. In the Mode 1 measurement, each of the orthogonal coils of an electromagnetic transmitter of a first auxiliary unit (or the central unit) is successively energized, and the resulting signal detected by the three orthogonal coils of an electromagnetic receiver in each of the other auxiliary and central units, so that for each electromagnetic transmitter, nine measurements are made with each electromagnetic receiver. In Mode 2, a signal is generated by electric dipole pairs, with the electrodes of the pair being located in the central or one of the auxiliary units, and the resulting signal is detected by each of the three orthogonal coils of an electromagnetic receiver, so that three measurements are made for each signal transmission. In mode 3, a signal is generated by an electric dipole, with the electrodes of the dipoles being located the central or one of the auxiliary units, and the resulting signal is detected by electric dipole receivers configured to detect signal in the of three orthogonal directions, so that three measurements are made for each signal transmission. In each of Modes 1, 2 and 3, for each tool location along the length of the borehole, the signal is transmitted from successive auxiliary (or central) units along the borehole tool and, for each successive transmission, the resistivity signal is detected by receivers in all of the auxiliary (or central) units not being utilized to transmit the signal. In particular embodiments of the invention the Mode 4 measurements are made and utilized, along with the Mode 1, Mode 2 and Mode measurements.

An electromagnetic coil transmitter generates an electromagnetic field which induces currents in the formation adjacent the borehole when current flowing through the coil transmitter is abruptly switched. These currents generate a secondary electromagnetic field which may be detected by the electromagnetic receiver, which comprises a magnetic field receiver or coil and an electric field receiver or electric dipole. The magnitude of the detected secondary magnetic field is predominantly proportional to the conductivity of the formation at target locations. The magnitude of the detected secondary electrical field is predominantly proportional to the conductivity of the formation at target locations and to the resistivity of the formation at target locations. The electromagnetic field generates a secondary electrical field and magnetic field which may be detected by a dipole receiver and electromagnetic receiver. The magnitude of the detected electric field is predominantly proportional to the resistivity of the formation at target locations. The magnitude of the detected magnetic field is predominantly proportional to the conductivity of the formation at target locations. Deviations from simple horizontal layers such as structure and large resistivity contrasts in the formation give rise to mixed sensitivities of the receivers. For a given transmitter, receivers spaced varying distances along the borehole are sensitive to conductivity and/or resistivity at varying distances from the borehole surface. Typically, the measurements will be sensitive to conductivity and/or resistivity of portions of the formation at distances from the borehole wall varying from 5 to 50 meters. Methods for determining the locations of the formation to which the measurements are sensitive to the conductivity and resistivity are well known to those of ordinary skill in the art.

Computer models, known to those of ordinary skill in the art, are utilized to interpret the Mode 2 and 3 measurements to determine the resistivity and the conductivity detected by the sensors. The sensitivity of the measurements and their respective modes is evaluated by calculating the Normalized Jacobian for changes in resistivity value of the respective formation units. The results are then plotted against time and the largest sensitivity indicate the more sensitive signals.

The time domain electric field signal may also be obtained by taking the gradient of the magnetic field signal detected by electromagnetic field receivers in cases where mud resistivity is too high and does not allow the electric field sensor to make contact with the formation. In another embodiment of the invention, magnetic field gradiometers or toroidal antennas may be utilized to measure resistivity in lieu of the electrodes. See, for example, Karinski, A., and Mousatov, A., 2001, Vertical Resistivity Estimation With Toroidal Antennas in Transversely Isotropic Media, SPWLA Transactions, paper BB.

The time domain electromagnetic measurements of conductivity and resistivity are utilized to refine the pseudo image developed by using the DC measurements of formation resistivity. As stated above, in certain embodiments of the invention, frequency domain electromagnetic measurement are utilized in conjunction with the time domain electromagnetic measurements. After the initial pseudo section image of the formation is developed using the DC measurement and the time domain electromagnetic measurements of conductivity and resistivity (and possibly frequency domain electromagnetic measurements) are utilized to refine the pseudo section image, the measured acoustic velocity is utilized to constrain the image. The transmitted seismic signal may be generated at the Earth's surface by seismic source 25 and detected with detector 52 in the central unit and detectors 58 in the auxiliary units in the borehole. In an alternative embodiment of the invention, the seismic signal is generated by a seismic source (not shown) located on the borehole tool.

In yet another embodiment of the invention frequency domain electromagnetic measurements are made of the Earth's subsurface in addition to the time domain measurements. As stated above, typically, frequency domain measurements are made by using a sinusoidal wave as the signal sources. Although frequency domain measurements are typically less sensitive to formation parameters in more distant regions of the formation surrounding the borehole, the quality of the formation image may be improved by including frequency domain data in the imaging process along with the time domain data.

In accordance with the present invention, the initial image for the subsurface is derived from the DC resistivity measurement. The enables the image to be developed as the well is being drilled rather than requiring lengthy inversion procedures to be performed in a data processing center days or weeks later. Fast inversion is performed on the DC data, and this inversion is utilized with the electromagnetic image. The seismic velocity data is utilized to constrain the resistivity/conductivity data; that is, within a region of the subsurface where the velocity is substantially constant, the resistivity/conductivity is also constrained to be constant.

Although the invention has been described in terms of an embodiment in which the tool 10 is lowered into a borehole by means of a wireline cable 12, in an alternate embodiment of the invention the tool may be conveyed into the borehole by means of convention drill pipe or tubing, or coiled tubing. A pipe or tubing conveyed system may be especially useful for deviated boreholes, or where descent of the tool may be obstructed because of borehole conditions.

In yet another embodiment, the invention is utilized for performing permanent sensor reservoir monitoring. This embodiment is substantially the same as the embodiment which utilizes a borehole tool, except that the sensor remain in permanent fixed position in the borehole.

Figure 10:
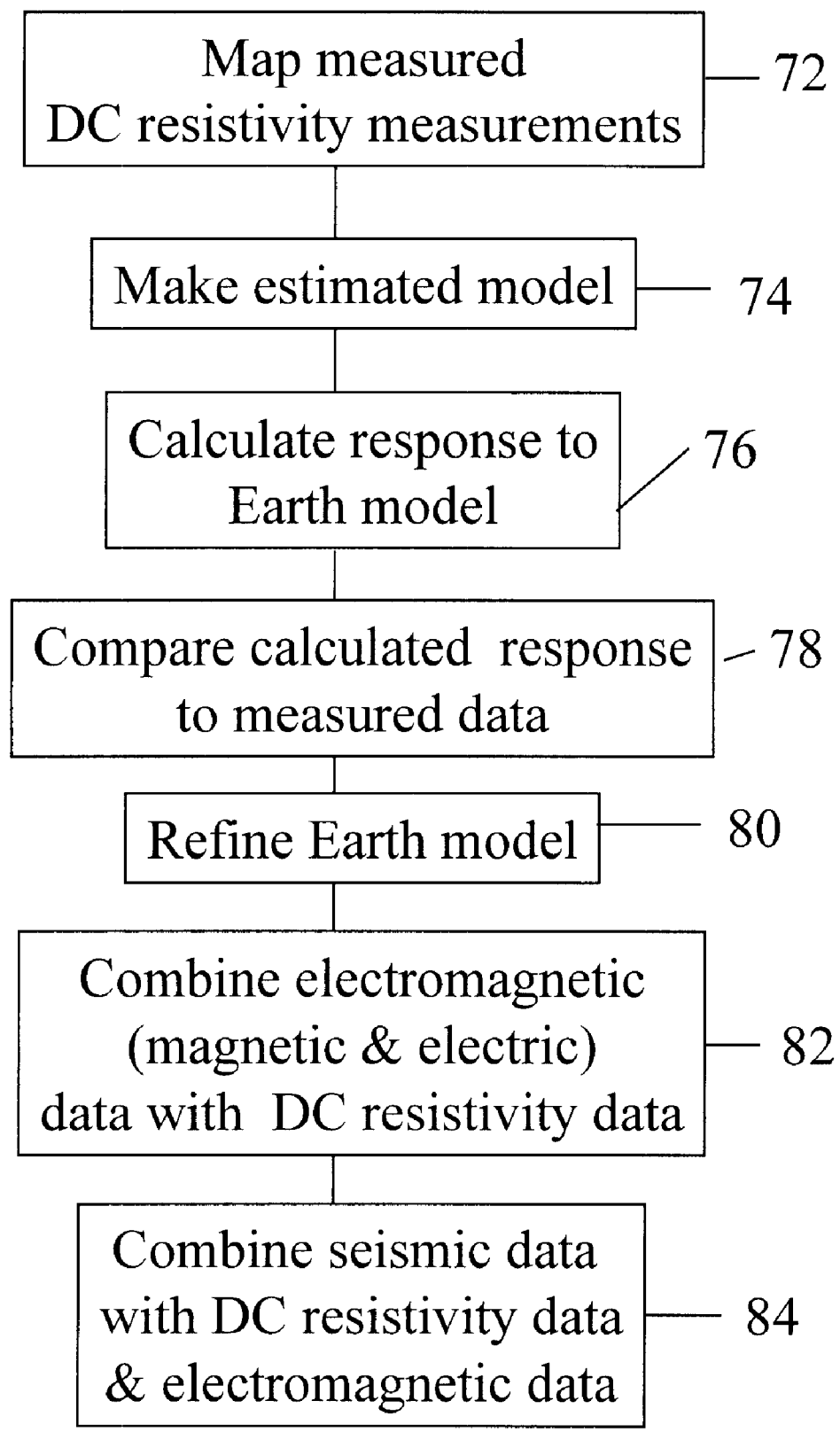
FIG. 10 is a flow diagram of an embodiment of the invention.

FIG. 10 shows a flow chart of a preferred embodiment of the invention. In step 72 a graphic representation of the formation resistivity measured with a DC signal is generated. In step 74 an Earth model is selected based on field data measurements. In step 76 a calculated response to the selected Earth model is generated for the tool configuration utilized in making the borehole measurement. In step 78 the calculated response to the selected Earth model is compared to the measured data. In step 80 the Earth model is modified based on this comparison. In step 82 electromagnetic data are combined with the DC resistivity data to refine the image generated from the DC resistivity data. In step 84 seismic data are utilized to constrain the image generated from the combination of the DC resistivity data and the electromagnetic data Those of ordinary skill in the art will understand that if a prior geologic data or other relevant a priori data are available that such a priori data may also be utilized in further refining the image of the subsurface generated in accordance with this invention.

In constructing the tool, the measured data are correlated with the conductivity and resistivity of the reservoir. It is contemplated that in calibrating the tool, measurements made in reservoirs having known parameters will be utilized to develop the relations between the measurements and the reservoir conditions. Such calibrations may also be updated continuously as logging and image development progresses.

Uses for the invention include but are not limited to prediction of conductivity anomalies ahead of the drill bit for those wells that are deviated or horizontal.

Radial sensitivity information is useful for making borehole corrections. To measure radial sensitivity an electric current is injected into the formation. The current flows along the borehole (casing, drilling fluid, mud etc.) and some of the electric current leaks into the formation. If the current flow is measured in two sequential places along the wellbore, the difference between the measurements can be attributed to the current that is leaking into the formation. The current is measured by measuring voltage, and the difference in the voltage measurements across the two sequential places can be attributed to current leaking into the formation. This difference is called second difference. The inclusion of the three ring-mounted electrode assemblies (44, 45 and 46) in the central unit the three ring-mounted electrode assemblies (38, 39 and 40) in the auxiliary units is especially useful for performing these second difference measurements.

It will be appreciated that various modifications and variations may be made to the invention without departing from the scope of the invention as defined in the appended claims. It is the intent to cover within the scope of the appended claims all such modifications and variations.

What is claimed is:

1. A method for generating an image of earth formations penetrated by a wellbore, comprising:

generating an initial model of the earth formations using formation resistivity measured by a direct current signal;

calculating a response to the initial model of an instrument used to make the direct current resistivity measurements;

comparing the calculated response to the measurements of resistivity;

adjusting the model and repeating the calculating and comparing until a difference between the calculated response and measurements reaches a minimum;

refining the adjusted model based on resistivity measurements made using an electromagnetic measuring instrument; and constraining the refined model using acoustic measurement parameters.

2. The method of claim 1 wherein the electromagnetic resistivity measurements comprise time domain electromagnetic measurements.

3. The method of claim 1 wherein the electromagnetic resistivity measurements comprise frequency domain electromagnetic measurements.

4. The method of claim 1 wherein the acoustic velocity measurements comprise seismic travel time measurements.

5. An instrument for well loggin a subsurface formation penetrated by a wellbore, comprising:
- a central unit comprising a communication system for communicating with surface equipment;
- at least one of a three-component instrument which is adapted to transmit or sense a magnetic field and at least one electric field transmitter, disposed within said central unit;
- at least two electrode assemblies positioned on said central unit, said electrode assemblies having a plurality of electrode contacts positioned thereon so that said contacts are usable as either a ring electrode or as discrete electrodes;
- a seismic sensor positioned on said central unit;
- a least one auxiliary unit spaced apart on said tool from said central unit;
- at least one of a three-component instrument which is adapted to either transmit or sense a magnetic field and an electric field transmitter disposed within said auxiliary unit;
- at least two electrode assemblies positioned on said auxiliary unit, said electrode assemblies having a plurality of electrode contacts positioned thereon so that said contacts are usable as either a ring electrode or as discrete electrodes;
- a seismic sensor positioned on said auxiliary unit; and
- a control system on said central unit for controlling operation of said tool.

6. The tool of claim 5 wherein at least one of said seismic sensors comprises a three component geophone and a hydrophone.

7. The tool of claim 5 wherein at least one of said seismic sensors comprises a four component geophone having sensors oriented so as to be substantially equally sensitive to noise in all directions.

8. The tool of claim 5 wherein at least one of said seismic sensors comprises a hydrophone and a four component geophone having sensors oriented at substantially 54 degree angles from each other.

* * * * *